United States Patent
Kerr et al.

(10) Patent No.: US 6,625,280 B1
(45) Date of Patent: Sep. 23, 2003

(54) BALANCED HEAT COIL PROTECTOR

(75) Inventors: David Kerr, Morris Plains, NJ (US); Walter Pelosi, Randolph, NJ (US); Mikhail Sumetskiy, Bridgewater, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/431,727

(22) Filed: Nov. 1, 1999

(51) Int. Cl.$^7$ ................................................. H04M 1/00
(52) U.S. Cl. ........................................ 379/412; 361/119
(58) Field of Search .................................. 379/412, 413, 379/413.01, 413.02, 413.04, 382, 399.01; 361/117, 118, 119, 133, 39, 40

(56) References Cited

U.S. PATENT DOCUMENTS

| | | |
|---|---|---|
| 4,736,269 A | 4/1988 | Amein et al. |
| 4,796,150 A | 1/1989 | Dickey et al. |
| 5,050,210 A | 9/1991 | Dillon et al. |
| 5,073,732 A | 12/1991 | Bockelmann |
| 5,172,297 A | 12/1992 | Imakoma et al. |
| 5,321,574 A | 6/1994 | Patrick et al. |
| 5,373,242 A | 12/1994 | Joulie et al. |
| 5,532,897 A | 7/1996 | Carpenter, Jr. |
| 5,875,090 A | 2/1999 | Joulie et al. |

OTHER PUBLICATIONS

7AB0, 7AB2, 7AB4, 7AB5 Balanced Solid State Protector Units, AT&T Network Systems, 1993.

Primary Examiner—Rexford Barnie
(74) Attorney, Agent, or Firm—Cohen, Pontani, Lieberman & Pavane

(57) ABSTRACT

A balanced heat coil protector protects telecommunications equipment from excessive sneak currents through a telecommunications circuit having a ring conductor and a tip conductor. An electrically conductive grounding pin is supported within and extends through the base for providing a path to ground potential. A first electrically conductive line pin and a first electrically conductive central office pin are supported in the base and extend therethrough, the first line pin and first central office pin being electrically connected to each other by a first conductive wire to provide a normal circuit current path from the first line pin to the first central office pin. A second electrically conductive line pin and a second electrically conductive central office pin are also supported in the base and extend therethrough, the second line pin and second central office pin being electrically connected to each other by a second conductive wire to provide a normal circuit current path from the second line pin to the second central office pin. A sleeve having electrically conductive flanged end portions is supported in an initial position within the housing on the grounding pin by a fusible material and is disposed above at least one of the first line and central office pins and at least one of the second line and central office pins, and the first and second conductive wires are wound about an outer surface of the sleeve. The fusible material melts in response to an excessive sneak current in either the ring or tip conductors causing the sleeve to move from the initial position to a grounding position in contact with at least one of the first line and central office pins and at least one of the second line and central office pins to simultaneously ground the ring and tip conductors.

15 Claims, 5 Drawing Sheets

BALANCED HEAT COIL PROTECTOR

BACKGROUND OF THE INVENTION

1. Field of the Invention

The present invention relates generally to the field of electrical protective devices and, more particularly, to an electrical protector having balanced heat coils to protect telecommunications circuits against excessive currents.

2. Description of the Related Art

In telecommunications systems, such as the public switched telephone network ("PSTN"), it is common to provide electrical protectors at central offices for each incoming line. These protectors typically provide protection against excessive voltages caused, for instance, by lightning, equipment failure or downed power lines, as well as protection against sneak currents. Sneak currents are produced at a relatively low magnitude compared to the excessive voltages mentioned above and are generally not strong enough to damage the telecommunications equipment if allowed to flow briefly. If allowed to persist, however, sneak currents may indeed pose a serious safety hazard by generating enough heat to char conductor insulation and start a fire, or otherwise cause damage. Sneak currents may be caused, for instance, by accidental interference between adjacent telephone and power lines, accidental shorting of wires in the central office, or a defect causing the protected telecommunications equipment to draw excessive sneak current.

To protect against these undesirable sneak currents, such protectors are typically provided with a pair of heat coils, one to protect the ring conductor and the other to protect the tip conductor associated with each telephone station apparatus. Each heat coil includes an insulated high resistance wire that is wound about a metal sleeve that is held in a predetermined position on a conductive line pin by a fusible bonding material (e.g., solder) having a predetermined melting point. One end of the insulated conductive wire is typically welded to the sleeve and the other end to the line pin. A spring typically biases the sleeve toward an electrical contact with a source of ground, the biasing force of the spring being less than the holding force of the fusible bonding material or solder. When excessive currents occur on the line and persist, sufficient heat is generated by the insulated conductive wire to melt the solder and release the sleeve, which sleeve is urged by the spring into electrical contact with the source of ground potential to ground the line.

While the above-mentioned protector design provides satisfactory protection against damage associated with excessive sneak currents, the ring and tip conductor circuits are not necessarily grounded at the same time. That is, assuming, for example, that an excessive sneak current causes the heat coil sleeve in the tip conductor circuit to electrically contact the ground potential, the sneak current may still flow from the ring conductor through the protected equipment and back through the tip conductor to ground if the differential voltage between the tip and ring conductors is not zero. The heat coil associated with the ring conductor will not ground the ring conductor circuit until the temperature associated with this excessive sneak current causes the solder holding the sleeve to melt and ground the ring conductor circuit. Therefore, it would be advantageous to provide a balanced heat coil protector where the ring and tip conductor circuits are grounded at the same time.

Additionally, conventional heat coil electrical protectors often provide undesirable interference of data being transmitted to and from the protected equipment (e.g., from the central office to the customer, or vice versa). It would also be desirable to provide a heat coil protector that eliminated such interference.

SUMMARY OF THE INVENTION

The foregoing and other objects and advantages are achieved in accordance with the present invention through the provision of a balanced heat coil electrical protector, which simultaneously grounds and shorts the ring and tip conductor circuits when an excessive sneak current occurs in the ring conductor circuit, the tip conductor circuit, or both.

In a preferred embodiment, a balanced heat coil protector is provided for protecting telecommunications equipment from excessive sneak currents through a telecommunications circuit having a ring conductor and a tip conductor. The balanced heat coil protector comprises a dielectric base and a dielectric housing adapted to be fixed to the base. An electrically conductive grounding pin is supported within and extends through the base for providing a path to ground potential. A first electrically conductive line pin and a first electrically conductive central office pin are supported in the base and extend therethrough, the first line pin and first central office pin being electrically connected to each other by a first conductive wire to provide a normal circuit current path from the first line pin to the first central office pin. A second electrically conductive line pin and a second electrically conductive central office pin are also supported in the base and extend therethrough, the second line pin and second central office pin being electrically connected to each other by a second conductive wire to provide a normal circuit current path from the second line pin to the second central office pin. A sleeve having electrically conductive flanged end portions is supported in an initial position within the housing on the grounding pin by a fusible material and is disposed above at least one of the first line and central office pins and at least one of the second line and central office pins, and the first and second conductive wires are wound about an outer surface of the sleeve. The fusible material melts in response to an excessive sneak current in either the ring or tip conductors causing the sleeve to move from the initial position to a grounding position in contact with at least one of the first line and central office pins and at least one of the second line and central office pins to simultaneously ground the ring and tip conductors.

In another preferred embodiment, a balanced heat coil protector is provided for protecting telecommunications equipment from excessive sneak currents through a telecommunications circuit having a ring conductor and a tip conductor. The balanced heat coil protector comprises a dielectric base and a dielectric housing adapted to be fixed to the base. An electrically conductive grounding pin is supported within and extends through the base for providing a path to ground potential. An electrically conductive grounding plate is positioned within the housing above the base and is electrically connected to an end of the grounding pin. First, second, third and fourth electrically conductive pins are supported in the base and extend therethrough. First and second heat coil contacts are disposed within the housing above the base, the first heat coil contact being electrically connected to the first pin and the second heat coil contact being electrically connected to the third pin. The first and second heat coil contacts and grounding plate are positioned within the housing to avoid contact with each other. A first electrically conductive sleeve having flanged end portions is supported in an initial position within the housing on the first pin by a fusible material and disposed above the grounding plate and the second heat coil contact. A first conductive wire is wound about an outer surface of the first sleeve with one end being electrically connected to an end portion of the sleeve and the opposing end of the first wire being electrically connected to the second pin to establish a normal current path from the first pin through the sleeve and wire to the second pin. A second electrically conductive sleeve having flanged end portions is supported in an initial position within the housing on the third pin by a fusible material and disposed above the grounding plate and the first heat coil contact. A second conductive wire is wound about an outer surface of the second sleeve with one end being electrically connected to an end portion of the second sleeve and the opposing end of the second wire being electrically connected to the fourth pin to establish a normal current path from the third pin through the second sleeve and second wire to the fourth pin. The fusible material melts in response to an excessive sneak current in the ring conductor causing the first sleeve to move from the initial position to a grounding position in contact with the grounding plate and second heat coil contact to simultaneously ground the ring and tip conductors, and the fusible material melts in response to an excessive sneak current in the tip conductor causing the second sleeve to move from the initial position to a grounding position in contact with the grounding plate and first heat coil contact to simultaneously ground the ring and tip conductors.

The foregoing specific objects and advantages of the invention are illustrative of those that can be achieved by the present invention and are not intended to be exhaustive or limiting of the possible advantages which can be realized. Thus, these and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

BRIEF DESCRIPTION OF THE DRAWINGS

The foregoing features and other aspects of the invention are explained in the following description taken in connection with the accompanying drawings wherein.

DETAILED DESCRIPTION

Figure 1:
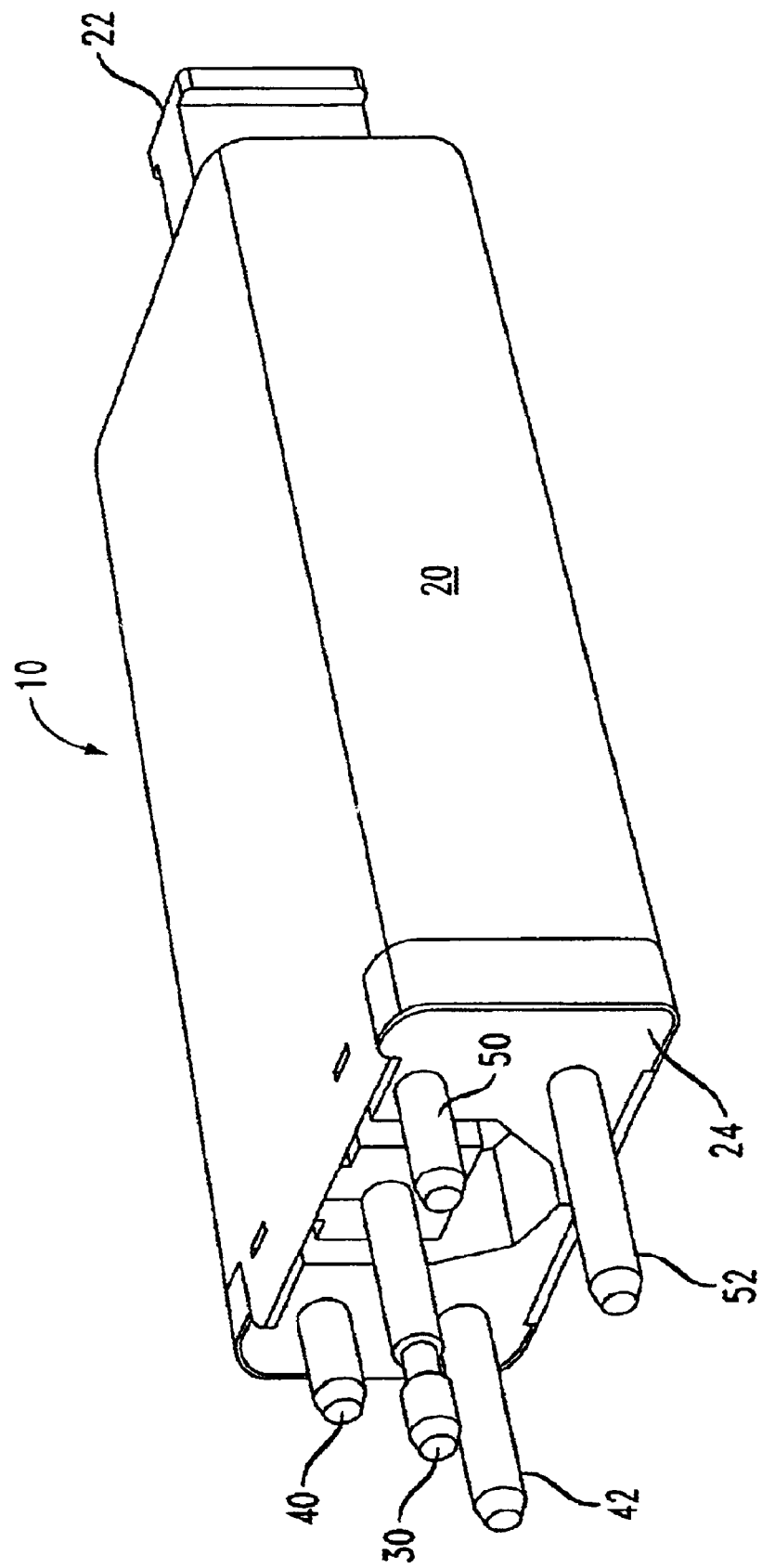
FIG. 1 is a perspective view of an assembled balanced heat coil protector module in accordance with the present invention.

Referring to FIG. 1, there is shown a balanced heat coil protector module 10 in accordance with the present invention, which is used for protecting telecommunications equipment and the like against undesirable sneak currents that may, for instance, appear in a telecommunications line interconnecting a subscriber's equipment with a central office. The protector 10 comprises a housing 20 that is preferably molded from a suitable plastic material. A plurality of protector modules 10 may be mounted in a panel or protector block (not shown) having a plurality of sockets therein for receiving a plurality of pins projecting from the array of circuit protector modules 10. The housing 20 may include a handle 22 to assist in the insertion/removal of the protector 10 from the panel or protector block.

In addition to the balanced heat coil protector discussed below, the protector module 10 may include a voltage protection or voltage surge limiter subassembly (not shown) for protecting a telecommunications line and associated equipment from excessive voltage resulting from lightning or the like, such as that described in U.S. Pat. Nos. 4,736,269 and 4,796,150, each of which is incorporated by reference herein.

The protector module 10 includes a base 24 through which a plurality of pins 30, 40, 42, 50 and 52 project. The base 24 is preferably made from a plastic insulating material and the pins 30, 40, 42, 50 and 52 are made from a suitable conducting material, such as a copper alloy plated with palladium and gold. Grounding pin 30 provides a path from the module to ground in the event of an excessive sneak current through the heat coil protector module 10. A first line pin 40 and a first central office pin 42 provide a normal circuit current path for a ring conductor of an associated telecommunications circuit (not shown). Similarly, a second line pin 50 and a second central office pin 52 provide a normal current path for a tip conductor of the telecommunications circuit.

Figure 2:
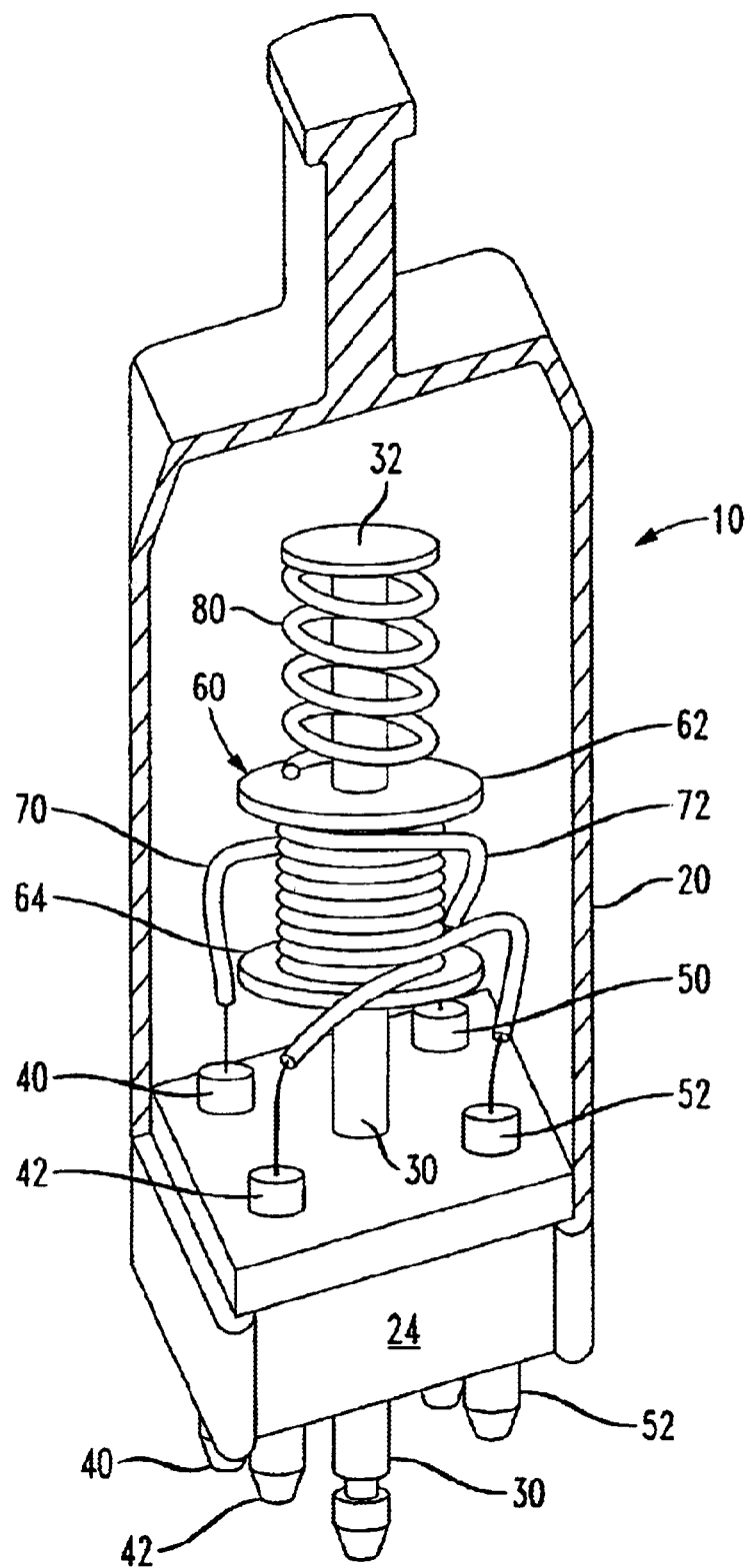
FIG. 2 is an isometric view of a preferred embodiment of the balanced heat coil protector module in accordance with the present invention.
Figure 3:
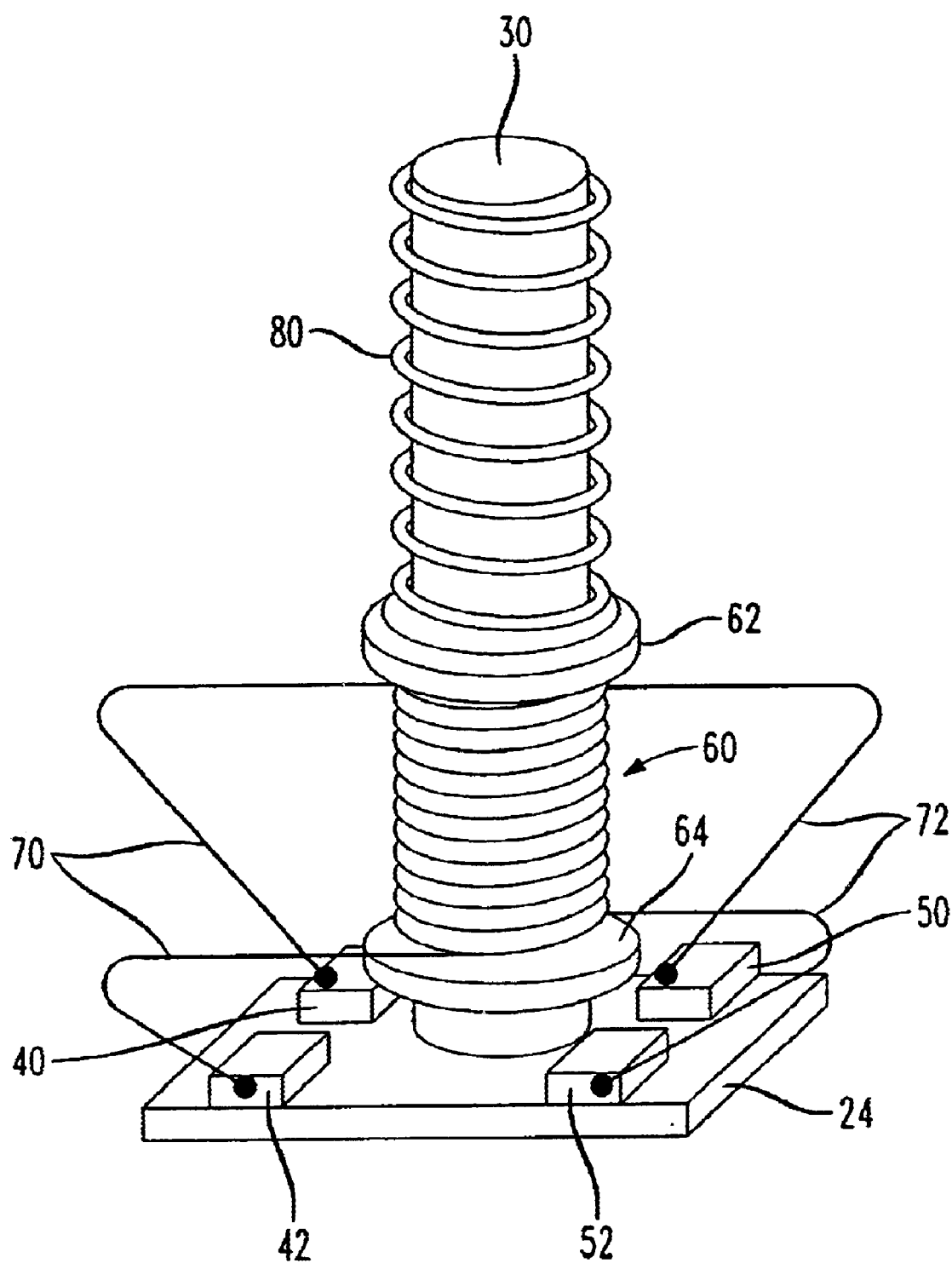
FIG. 3 is a partial view of the heat coil protector of FIG. 2.

Referring to FIGS. 2 and 3, a portion of grounding pin 30 enclosed within housing 20 is surrounded by the inner surface of a cylindrical sleeve or spool 60, aligned axially therewith and bonded to the grounding pin 30 by a suitable fusing material having a predetermined melting temperature (e.g., solder). The sleeve 60 is made from a suitable conducting material such as brass, and includes an upper flange 62 and a lower flange 64 between which first and second coils of insulated wire 70, 72 are wound in opposing directions around the outer surface of sleeve 60. Insulated wire 70, 72 is made of a suitable conducting material, such as nichrome, that is covered with insulation. One end of insulated wire 70 is welded or otherwise electrically connected to the upper end of first line pin 40 and the other end is welded or otherwise electrically connected to the upper end of first central office pin 42. Similarly, one end of insulated wire 72 is welded or otherwise electrically connected to the upper end of second line pin 50 and the other end is welded or otherwise electrically connected to the upper end of second central office pin 52. Thus, the normal flow of current for the ring conductor circuit between a subscriber's equipment and central office equipment will traverse line pin 40, insulated wire coil 70 and central office pin 42. Similarly, the normal flow of current for the tip conductor circuit between a subscriber's equipment and central office equipment will traverse line pin 50, insulated wire coil 72 and central office pin 52.

Should an undesirable sneak current or current overload develop in either the ring or tip circuits, heat generated as current flows through insulated wire coil 70 or 72 will melt the solder bonding sleeve 60 to the grounding pin 30, thereby permitting movement of the sleeve 60 relative the pin 30. A spring 80 mounted between the head 32 of grounding pin 30 and the upper flange 62 of the sleeve 60 biases the sleeve 60 downward against the upper ends of line pins 40 and 50 and/or central office pins 42 and 52 to simultaneously ground both the ring and tip conductor circuits. Thus, the lower flange 64 of sleeve 60 should be of sufficient size or shape to make contact with the upper end of at least the line pin 40, 50 or central office pin 42, 52 of the ring and tip conductor circuits.

In addition, by winding the insulated wire coils 70, 72 around the sleeve 60 in opposing directions as illustrated in FIGS. 2 and 3, undesirable interference or cross-talk may be eliminated or minimized.

Figure 4:
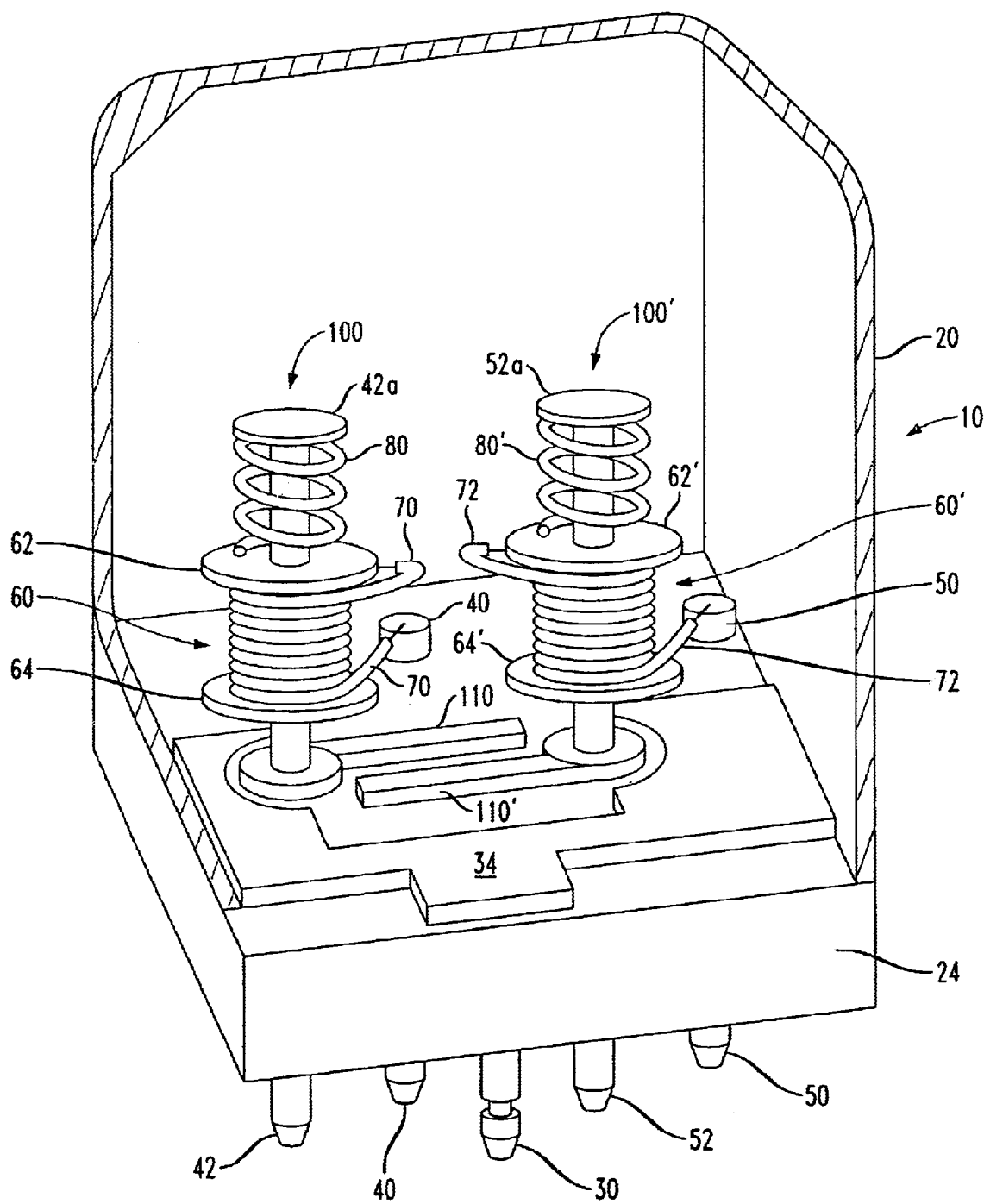
FIG. 4 is an isometric view of another preferred embodiment of the balanced heat coil protector module in accordance with the present invention.
Figure 5:
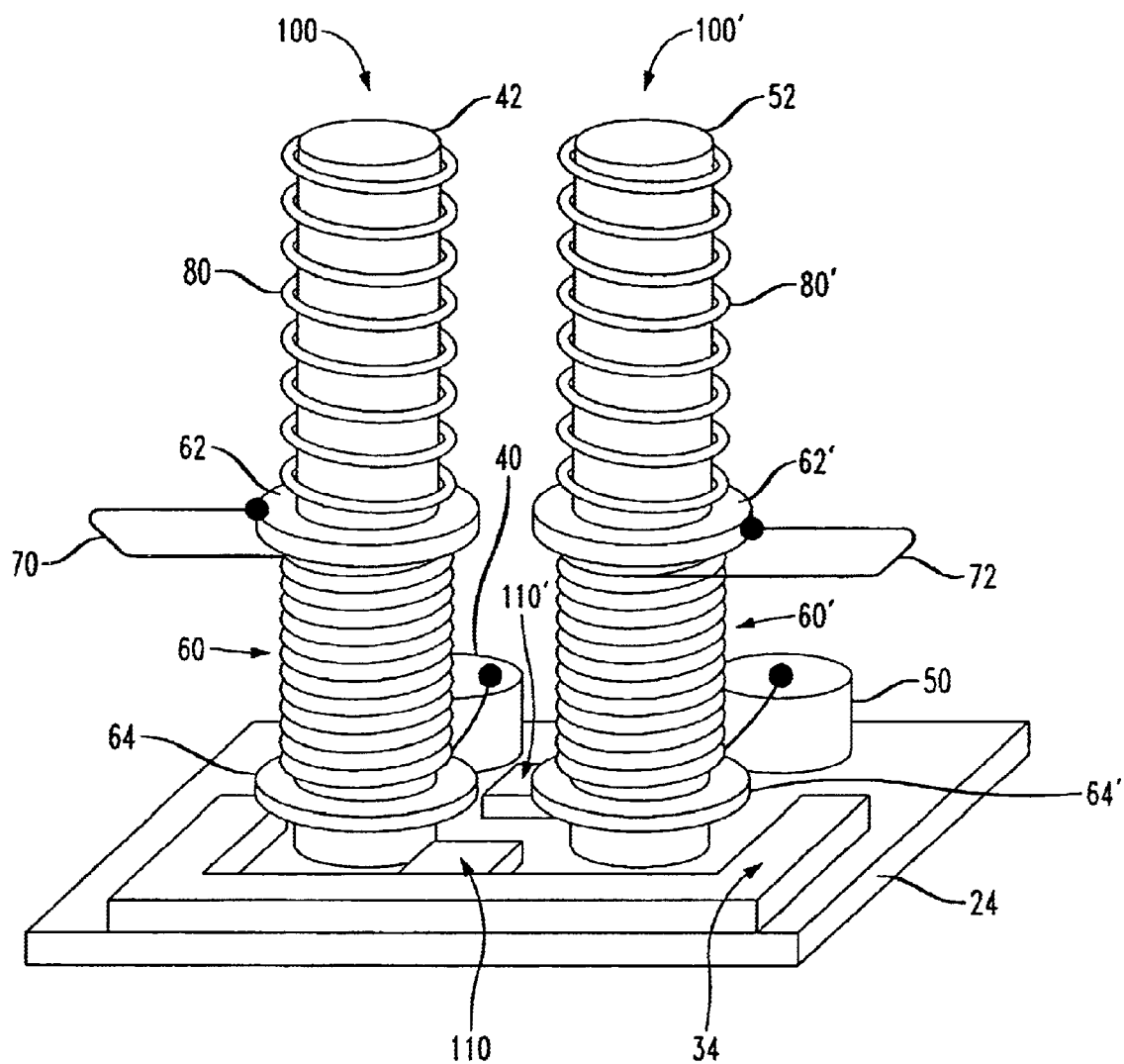
FIG. 5 is a partial view of the heat coil protector of FIG. 4.

In another preferred embodiment illustrated in FIGS. 4 and 5, a pair of heat coil protector subassemblies 100, 100' are enclosed within the housing 20 of the protector module 10. One of the heat coil protector subassemblies 100 provides protection for the ring conductor circuit and the other 100' provides protection for the tip conductor circuit of an associated telecommunications circuit (not shown). The heat coil protector subassemblies 100, 100' are generally identical to each other in structure and operation.

Like the preceding embodiment, the protector module 10 includes a base 24 through which a plurality of pins 30, 40, 42, 50 and 52 project (see FIG. 1). The base 24 is preferably made from a plastic insulating material and the pins 30, 40, 42, 50 and 52 are made from a suitable conducting material, such as a copper alloy plated with palladium and gold. Grounding pin 30 provides a path from the module to ground in the event of an excessive sneak current through the heat coil protector module 10. The first line pin 40 and the first central office pin 42 provide a normal circuit current path for a ring conductor of an associated telecommunications circuit (not shown). Similarly, the second line pin 50 and the second central office pin 52 provide a normal current path for a tip conductor of the telecommunications circuit.

Referring to FIGS. 4 and 5, the first and second heat coil protector subassemblies 100, 100' are located with the housing 20. The first heat coil protector subassembly 100 comprises a cylindrical sleeve or spool 60 surrounding and axially aligned with a portion of the first central office pin 42, which sleeve is bonded to the first central office pin 42 by a suitable fusing material having a predetermined melting temperature (e.g., solder). The sleeve 60 is made from a suitable conducting material such as brass, and includes an upper flange 62 and a lower flange 64 between which a first coil of insulated wire 70 is wound around the outer surface of sleeve 60. Insulated wire 70 is made of a suitable conducting material, such as nichrome, that is covered with insulation. One end of insulated wire 70 is welded or otherwise electrically connected to the upper end of first line pin 40 and the other end is welded or otherwise electrically connected to the upper flange 62 of sleeve 60. Thus, the normal flow of current for the ring conductor circuit between a subscriber's equipment and central office equipment will traverse line pin 40, insulated wire coil 70, sleeve 60 and central office pin 42.

Similarly, the second heat coil protector subassembly 100' comprises a cylindrical sleeve or spool 60' surrounding and axially aligned with a portion of the second central office pin 52, which sleeve 60' is bonded to the second central office pin 52 by a suitable fusing material having a predetermined melting temperature (e.g., solder). The sleeve 60' is made from a suitable conducting material such as brass, and includes an upper flange 62' and a lower flange 64' between which a second coil of insulated wire 72 is wound around the outer surface of sleeve 60'. Insulated wire 72 is made of a suitable conducting material, such as nichrome, that is covered with insulation. One end of insulated wire 72 is welded or otherwise electrically connected to the upper end of second line pin 50 and the other end is welded or otherwise electrically connected to the upper flange 62' of sleeve 60'. Thus, the normal flow of current for the tip conductor circuit between a subscriber's equipment and central office equipment will traverse line pin 50, insulated wire coil 72, sleeve 60' and central office pin 52.

A spring 80 is retained in the housing 20 above the spool 60 and biases the sleeve 60 toward a grounding plate 34, which grounding plate 34 is secured and electrically connected to the grounding pin 30 in a conventional manner, such as by welding or riveting the grounding pin 30 to the grounding plate 34. Similarly, a spring 80' is retained in the housing 20 above the spool 60' and biases the sleeve 60' toward a grounding plate 34. The springs 80, 80' provide a compression or biasing force that is less than the holding force of the fusible material (e.g., solder) holding the sleeve 60, 60' on the central office pin 42, 52 when the fusible material is in solid state (e.g., not melted due to increased temperature associated with an undesirable sneak current). As illustrated in FIGS. 4 and 5, the spring 80 may preferably be retained in compressive engagement between the upper flange 62 of the sleeve 60 and a head 42a formed on the central office pin 42. Similarly, the spring 80' may preferably be retained in compressive engagement between the upper flange 62' of the sleeve 60' and a head 52a formed on the central office pin 52.

The grounding plate 34 is made of a suitable conductive material and is disposed above a top surface of base 24 and beneath the lower flange 64, 64' of sleeves 60, 60' within the housing 20. A portion of the grounding plate 34 is cut away to provide access for the positioning of heat coil contacts 110, 110' so that heat coil contacts do not contact the grounding plate 34. Heat coil contact 110 is formed from a suitable conductive material and is electrically connected to the central office pin 42 within the housing 20 beneath the sleeve 60. Similarly, heat coil contact 110' is formed from a suitable conductive material and is electrically connected to the central office pin 52 within the housing 20 beneath the sleeve 60'. The heat coil contacts 110, 110' may be of any desired size and shape suitable for positioning within housing 20 so long as: (1) the heat coil contacts 110, 110' do not contact each other or the grounding plate 34 when positioned within the housing 20; (2) the sleeve 60 contacts the heat coil contact 110' when the sleeve 60 is biased against the grounding plate 34 during an undesirable sneak current or current overload in the ring conductor circuit; and (3) the sleeve 60' contacts the heat coil contact 110 when the sleeve 60' is biased against the grounding plate 34 during an undesirable sneak current or current overload in the tip conductor circuit The preferred operation of the second preferred embodiment illustrated in FIGS. 4 and 5 is described below. Should an undesirable sneak current or current overload develop in the ring circuit protected by the first heat coil protector subassembly 100, heat generated as current flows through insulated wire coil 70 will melt the solder bonding sleeve 60 to the first central office pin 42, thereby permitting movement of the sleeve 60 relative the pin 42. The spring 80 preferably mounted between the head 42a of central office pin 42 and the upper flange 62 of the sleeve 60 biases the sleeve 60 downward against the grounding plate 34 and against the tip conductor heat coil contact 110' to simultaneously ground both the ring and tip conductor circuits.

Similarly, should an undesirable sneak current or current overload develop in the tip conductor circuit protected by the second heat coil protector subassembly 100', heat generated as current flows through insulated wire coil 72 will melt the solder bonding sleeve 60' to the second central office pin 52, thereby permitting movement of the sleeve 60' relative the pin 52. The spring 80' preferably mounted between the head 52a of central office pin 52 and the upper flange 62' of the sleeve 60' biases the sleeve 60' downward against the grounding plate 34 and against the ring conductor heat coil contact 110 to simultaneously ground both the ring and tip conductor circuits.

Although illustrative preferred embodiments have been described herein in detail, it should be noted and will be appreciated by those skilled in the art that numerous variations may be made within the scope of this invention without departing from the principle of this invention and without sacrificing its chief advantages. For instance, in addition to the balanced heat coil protector discussed above for protecting against undesirable sneak currents, a voltage protection or voltage surge limiter subassembly (not shown) may also be provided in the protector module 10 for protecting against excessive voltage resulting from lightning or the like, such as that described in U.S. Pat. Nos. 4,736,269 and 4,796,150, each of which is incorporated by reference herein. The terms and expressions have been used herein as terms of description and not terms of limitation. There is no intention to use the terms or expressions to exclude any equivalents of features shown and described or portions thereof and this invention should be defined in accordance with the claims that follow.

We claim:

1. A balanced heat coil protector for protecting telecommunications equipment from excessive sneak currents through a telecommunications circuit having a ring conductor and a tip conductor, comprising:

a dielectric base;

a dielectric housing adapted to be fixed to the base;

an electrically conductive grounding pin supported within and extending through the base, the grounding pin providing a path to ground potential;

a first electrically conductive line pin and a first electrically conductive central office pin supported in the base and extending therethrough, the first line pin and first central office pin electrically connected to each other by a first conductive wire to provide a normal circuit current path from the first line pin to the first central office pin;

a second electrically conductive line pin and a second electrically conductive central office pin supported in the base and extending therethrough, the second line pin and second central office pin electrically connected to each other by a second conductive wire to provide a normal circuit current path from the second line pin to the second central office pin; and a sleeve having electrically conductive flanged end portions supported in an initial position within the housing on the grounding pin by a fusible material and disposed above at least one of the first line and central office pins and at least one of the second line and central office pins, the first and second conductive wires being wound about an outer surface of the sleeve;

wherein the fusible material melts in response to an excessive sneak current in either the ring or tip conductors causing the sleeve to move from the initial position to a grounding position in contact with at least one of the first line and central office pins and at least one of the second line and central office pins to simultaneously ground the ring and tip conductors.

2. The balanced heat coil protector according to claim 1, comprising a spring for biasing the sleeve in a direction against at least one of the first line and central office pins and at least one of the second line and central office pins to ground the ring and tip conductors simultaneously in the event of an excessive sneak current in either the ring or tip conductors.

3. The balanced heat coil protector according to claim 1, wherein the fusible material is solder.

4. The balanced heat coil protector according to claim 1, wherein the first and second conductive wires are coated with an insulating material.

5. The balanced heat coil protector according to claim 1, wherein the first and second conductive wires are wound in opposing directions about the outer surface of the sleeve.

6. The balanced heat coil protector according to claim 1, further comprising a surge voltage protection subassembly for protecting the circuit against excessive voltages.

7. A balanced heat coil protector for protecting telecommunications equipment from excessive sneak currents through a telecommunications circuit having a ring conductor and a tip conductor, comprising:

a dielectric base;

a dielectric housing adapted to be fixed to the base;

an electrically conductive grounding pin supported within and extending through the base, the grounding pin providing a path to ground potential;

an electrically conductive grounding plate positioned within the housing above the base and electrically connected to an end of the grounding pin;

first, second, third and fourth electrically conductive pins supported in the base and extending therethrough;

first and second heat coil contacts disposed within the housing above the base, the first heat coil contact electrically connected to the first pin and the second heat coil contact electrically connected to the third pin, the first and second heat coil contacts and grounding plate positioned within the housing to avoid contact with each other;

a first electrically conductive sleeve having flanged end portions and supported in an initial position within the housing on the first pin by a fusible material and disposed above the grounding plate and the second heat coil contact;

a first conductive wire wound about an outer surface of the first sleeve with one end electrically connected to an end portion of the sleeve and the opposing end of the first wire electrically connected to the second pin to establish a normal current path from the first pin through the sleeve and wire to the second pin;

a second electrically conductive sleeve having flanged end portions and supported in an initial position within the housing on the third pin by a fusible material and disposed above the grounding plate and the first heat coil contact;

a second conductive wire wound about an outer surface of the second sleeve with one end electrically connected to an end portion of the second sleeve and the opposing end of the second wire electrically connected to the fourth pin to establish a normal current path from the third pin through the second sleeve and second wire to the fourth pin;

wherein the fusible material melts in response to an excessive sneak current in the ring conductor causing the first sleeve to move from the initial position to a grounding position in contact with the grounding plate and second heat coil contact to simultaneously ground the ring and tip conductors; and wherein the fusible material melts in response to an excessive sneak current in the tip conductor causing the second sleeve to move from the initial position to a grounding position in contact with the grounding plate and first heat coil contact to simultaneously ground the ring and tip conductors.

8. The balanced heat coil protector according to claim 7, wherein the grounding plate surrounds without contacting a portion of the first and third pins, and has a central cut-out section within which the first and second heat coil contacts are disposed without contacting the grounding plate.

9. The balanced heat coil protector according to claim 7, wherein the first pin is a line pin and the second pin is a central office pin.

10. The balanced heat coil protector according to claim 7, wherein the third pin is a line pin and the fourth pin is a central office pin.

11. The balanced heat coil protector according to claim 7, comprising a spring for biasing the first sleeve in a direction against the grounding plate and second heat coil contact to ground the ring and tip conductors simultaneously in the event of an excessive sneak current the ring conductor.

12. The balanced heat coil protector according to claim 7, comprising a spring for biasing the second sleeve in a direction against the grounding plate and first heat coil contact to ground the ring and tip conductors simultaneously in the event of an excessive sneak current the tip conductor.

13. The balanced heat coil protector according to claim 7, wherein the fusible material is solder.

14. The balanced heat coil protector according to claim 7, wherein the first and second conductive wires are coated with an insulating material.

15. The balanced heat coil protector according to claim 7, further comprising a surge voltage protection subassembly for protecting the circuit against excessive voltages.

* * * * *